UNITED STATES PATENT OFFICE.

ROBERT A. CHESEBROUGH, OF NEW YORK, N. Y.

IMPROVEMENT IN ANTISEPTIC FERTILIZERS.

Specification forming part of Letters Patent No. 152,725, dated July 7, 1874; application filed June 8, 1874.

*To all whom it may concern:*

Be it known that I, ROBERT A. CHESEBROUGH, of the city of New York, State of New York, have invented a certain new Antiseptic Fertilizer, of which the following is a specification:

This new fertilizing-agent is composed of animal charcoal or bone-black and hydrocarbon oil mixed together, the oil being taken up and retained in the pores of the bone-black. The proportions of each should be about seventy per cent. in weight of bone-black and about thirty per cent. in weight of oil; but I do not confine myself to these proportions, as it is obvious that different proportions may be better adapted to different classes of vegetable growth.

Bone-black, it is well-known, has heretofore been largely employed as the base for a class of fertilizers known as superphosphates; hence its value for such uses may be conceded. I have proven by experiment that petroleum is an antiseptic, an insecticide, and is destructive to cryptogamic and fungus growths. I have also discovered that the oil, when mixed with bone-black, is not injurious to vegetation. Consequently, I thus obtain a fertilizer, which is also a preservative against those insects, parasites, and creatures of fungus origin, which develop beneath the soil and oftentimes destroy the life of the plant—such, for instance, as the potato-rot, the boring-worm, the "philoxera" or grape-vine pest, and a host of others. If it is true, as held to be the fact by high scientific authority, "that the development of destructive pests on the plant itself, similar to the cotton and cabbage worms, is due to pernicious or poisonous soil nourishment, rather than to atmospheric influence," then I claim that the use of my new antiseptic fertilizer will prevent the development and ravages of these outside parasites, as well as of those developed within the soil.

To manufacture the said fertilizer it is only necessary to intimately mix the oil with the bone-black in about the proportions indicated, the bone-black having been first ground to the fineness of fine sporting gunpowder, although the degree of fineness is not of much importance. The best oil to use is the heavy natural crude or reduced petroleum, rejecting the lighter grades of oil and distillates as inferior.

To apply the fertilizer it should be mixed—say half and half with natural earth—and the compound then intimately mingled with the soil around the roots of the plant or with that in which the seed is or is to be deposited, but experience will soon teach the user the best way to apply it in each particular case.

My invention covers the combination of bone-black and oil in all proportions, whether other substances make part of the fertilizer or not, and whether the admixture shall be acted on by acids or not. My invention is applicable to all vegetable growths, including horticulture and fancy gardening.

I claim as my invention—

A new antiseptic fertilizer, composed in part or in whole of a combination of bone-black and hydrocarbon oil, as and for the purposes set forth, substantially as described.

ROBT. A. CHESEBROUGH.

Witnesses:
 THOMAS J. O'CONNELL,
 JAMES OWENS.